United States Patent Office 3,037,855
Patented June 5, 1962

3,037,855
PROCESS FOR PEBBLING BY SPRAYING A MIXTURE OF AMMONIUM NITRATE AND AMMONIUM PHOSPHATES
Joseph A. Smith, Richmond, Va., assignor to Allied Chemical Corporation, New York, N.Y., a corporation of New York
No Drawing. Filed May 23, 1958, Ser. No. 737,194
12 Claims. (Cl. 71—64)

This invention relates to mixed fertilizers. More particularly it relates to pebbled mixed fertilizers prepared from wet process phosphoric acid and to the process for making the same.

In recent years interest has increased in both high analysis fertilizers and fertilizers with high water-soluble $P_2O_5$ content. This has led to the development of several processes for the production of monoammonium phosphate, diammonium phosphate, mixtures of the ammonium phosphates, and mixed fertilizers in which ammonium phosphates are used to supply the $P_2O_5$ content.

The compositions of fertilizer grade monoammonium phosphate and diammonium phosphate, approximately 11–48–0 and 18–48–0, respectively, are such that for most crops and soils supplemental nitrogen is required to achieve the optimum balance of N to $P_2O_5$. The additional N may be added by separate application of a nitrogen salt such as ammonium nitrate, or the ammonium phosphates may be incorporated into a mixed fertilizer to obtain a better ratio of the plant foods.

Much of the development work on ammonium phosphate fertilizers has been devoted to means of using low-cost wet-process phosphoric acid rather than furnace grade phosphoric acid. The preparation of ammonium phosphates from wet-process acid made by treating phosphate rock with sulfuric acid is complicated by the fact that on neutralizing the acid with ammonia a gelatinous precipitate containing chiefly iron, aluminum, and ammonium phosphates separates out, which is difficult to filter. The best method heretofore developed to handle wet-process acid has been to produce a granulated fertilizer by combining a slurry obtained by ammoniation of the acid with recycled dried product to form a mixture suitable for feed to granulators and rotary driers. A typical commercial process makes use of a recycle to product ratio of 5 to 1. Accordingly, in order to produce 10 tons per hour it is necessary to have recycle-slurry mixers, driers, and screeners to handle 60 tons per hour, recycle crushers to handle 40 to 50 tons per hour, and conveyors and elevators to handle comparable tonnages. Thus, the high recycle load leads to high initial investment and high maintenance and operating costs per ton of product.

Another method suggested has been to filter off the initial precipitate formed during ammoniation of wet process acid. The filtrate can then be further ammoniated and processed in conventional crystallizers and centrifuges to obtain mono- and diammonium phosphates. Since the cake obtained during the preliminary filtration contains appreciable quantities of available $P_2O_5$ and some nitrogen, it is necessary to reblend this cake with the ammonium phosphate cake in order to avoid excessive plant food loss. The process is costly since it involves separate ammoniation and filtration equipment plus equipment to reblend the cake with the ammonium phosphate prior to drying. Also, the preliminary filtration step is slow and difficult.

It has now been found that despite the relative instability of ammonium phosphate at elevated temperatures, it is possible to heat certain mixtures of ammonium nitrate, mono- and diammonium phosphates to 160–185° C. for short periods of time with little loss of ammonia. It is also possible to select the composition of these mixtures to obtain a fluid slurry containing as little as 0.5% water that is pumpable and can be pelleted at temperatures of 160–185° C. Mixtures meeting these conditions have from 0 to 2 pounds of diammonium phosphate per pound of monoammonium phosphate and from 0.5 to 1.2 pounds of ammonium nitrate per pound of total ammonium phosphate. Such mixtures show a minor loss of nitrogen, usually less than 3% of the total nitrogen, when held at temperatures of 160 to 185° C. for less than ten minutes. The impurities precipitated by ammoniation of wet-process phosphoric acid do not adversely affect the stability or fluidity of these slurries at the elevated temperatures.

On the basis of the physical characteristics of mixtures of ammonium nitrate with monoammonium phosphate or mono- and diammonium phosphate, within the limits described above, a simple, economical process for preparing mixed fertilizers has been developed. The process consists in ammoniating phosphoric acid, evaporating the resultant product in admixture with contained or added ammonium nitrate rapidly in a low retention time evaporator, such as a flash evaporator, falling film evaporator or Turba-Film evaporator (see Example 4) to obtain a concentrated slurry at about 160 to 185° C. with 0.5 to 3% water content, transferring the concentrated slurry to a pebbling tower, and pebbling the slurry by dispersing it into drops in a gaseous cooling medium and allowing them to fall freely a sufficient distance to permit the drops to solidify. The ammoniation is carried to a pH of 3.5 to 7, usually to a pH of 4 to 6 to produce the desired weight ratios of mono- and diammonium phosphates. Since the material is not to be filtered, particle size of the precipitated solids is not important and it is not necessary to carefully select or regulate concentration, agitation, temperature, or the rate of addition of the ammonia to obtain coarse crystals.

Wet-process phosphoric acid of any available concentration may be used in the process and the ammoniation rate is limited only by the ability of the equipment to adequately disperse the ammonia and permit efficient absorption. It is apparent that furnace grade phosphoric acid could be substituted in this process, but because of lower cost we prefer to use the wet-process phosphoric acid. Liquid or gaseous anhydrous ammonia, aqua ammonia, or ammonium nitrate-ammonia-water solutions may be used according to availability and price. Solid or aqueous ammonium nitrate can be added before, during, or after the ammoniation as convenient. Nitric acid may also be used with sufficient additional ammonia added during ammoniation to neutralize this acid.

If $K_2O$ is desired in the final product, fertilizer grade muriate of potash may be added to the mixture, preferably after ammoniation to limit the corrosion of equipment. Addition of KCl should be limited to less than about one pound of KCl for each pound of ammonium nitrate in the solution in order to obtain a fluid slurry suitable for pebbling.

Pebbling of slurry at temperatures lower than 160° C. is undesirable because at such lower temperatures it is necessary to retain more than 3% water to obtain the necessary fluidity for good pebble formation. Pebbles made with greater than about 3% water tend to stick to the collecting hopper during pebbling and require additional drying after pebbling to obtain good storage characteristics. During pebbling some ammonia loss occurs gradually even at temperatures as low as 160° C. and the loss accelerates as temperatures are raised. For this reason it is desirable to limit the upper temperature for heating the slurry to 185° C. and preferably to 180° C. and to hold the slurry at these elevated temperatures for less than ten minutes and preferably no more than five minutes.

The range of products that can be made by the above procedure contain about 16 to 26% nitrogen, 20 to 35% $P_2O_5$, and 0 to 16% $K_2O$. These products are somewhat higher in nitrogen and lower in $P_2O_5$ than the ammonium phosphate salts now commercially available and thus for most applications more nearly supply the balance of N and $P_2O_5$ required. Of the total $P_2O_5$ in these products when made from wet-process phosphoric acid generally 95% or more is water soluble, less than 1% is citrate insoluble, and the remainder is citrate soluble. Production of several grades of fertilizer by the process of this invention is described in the following examples.

*Example 1*

In an open vessel equipped with stirrer, 187.5 pounds of 42% nitric acid was mixed with 203 pounds of wet-process phosphoric acid analyzing 42.5% $P_2O_5$. Under the liquid surface, 43 pounds of gaseous anhydrous ammonia was added over a period of 10 to 20 minutes. This resulted in a slurry mixture in which the weight ratio of ammonium nitrate to monoammonium phosphate was approximately 0.7. The heat of neutralization of the acids caused the mixture to boil and some water was evaporated. The slurry formed by ammoniation had a pH of about 4 and contained about 40% water. Water was evaporated from this slurry by passing it at a rate of 85 pounds per hour through a Turba-Film evaporator having one square foot heat transfer area. The evaporator was operated at 2400 r.p.m. rotor speed and with 235 p.s.i.g. steam pressure in the jacket. The slurry was retained less than 10 seconds in the evaporator and was discharged at about 175° C. and contained about 1% water. It was immediately pumped to the top of a tower where it was dispersed into drops by spraying off the surface of a drum heated to 180° C. and revolving at about 200 r.p.m. The slurry was at a temperature of 175-180° C. for less than five minutes with nitrogen loss less than 3% of the total N. The drops were permitted to fall freely about 75 feet during which period they hardened into spherical pellets that did not stick to the collecting hopper. Analysis showed the product to contain 21.0% N, 34.2% total $P_2O_5$, 33.0% water soluble $P_2O_5$, 0.17% citrate insoluble $P_2O_5$, and 0.7% $H_2O$. Screening on Tyler standard screens showed about 98% of the particles to be in the size range of 8 to 20 mesh.

*Example 2*

In a stirred tank was placed 1000 pounds of wet-process phosphoric acid with the following analysis.

Material: Weight percent
Total $P_2O_5$ _____ 25.8
CaO _____ 0.6
F _____ 1.7
$SO_3$ _____ 0.25
Fe _____ 1.03
Al _____ 1.30

Next, 580 pounds of a solution containing 83 weight percent of ammonium nitrate was added. Approximately 110 pounds of gaseous ammonia was introduced rapidly below the liquid surface to bring the slurry pH to about 5.8. The ammoniated slurry contained about 1.7 pounds of diammonium phosphate per pound monoammonium phosphate and 1.0 pound of ammonium nitrate per pound of total ammonium phosphates. During the addition of ammonia a fine precipitate first formed consisting chiefly of aluminum, iron, and calcium salts as fluorides, sulfates, and phosphates. As the ammoniation proceeded toward completion some ammonium phosphates also precipitated. The hot slurry, containing about 40% water was pumped several times through a 3¼ inch I.D. falling film evaporator 18.8 feet in length to reduce the water content to 1 to 3%. Typical data for the evaporator were as follows:

Slurry flow rate, lbs./minute_____ 24
Slurry exit temp., ° C_____ 170
Evaporator jacket temp., ° C_____ 192
Cocurrent air flow rate, c.f.m_____ 75
Air inlet temp., ° C_____ 135

Typical analysis of the evaporated slurry was:
 Weight percent
Water _____ 1.0
Ammoniacal nitrogen_____ 17.3
Total nitrogen_____ 25.3
Citrate insoluble $P_2O_5$_____ 0.0

Slurry was withdrawn from the evaporator receiver and pumped to the top of a tower where it was pebbled in accordance with the procedure described in Example 1. The following data were obtained:

| Pebbling run | 1 | 2 | 3 |
|---|---|---|---|
| Temp. of slurry at pebbling drum, ° C | 180 | 167 | 167 |
| Slurry water content, percent | 3.1 | 1.6 | 1.0 |
| Drum temperature, ° C | 180 | 178 | 178 |
| Product moisture, percent | 2.0 | 1.2 | 0.6 |
| Screen analyses, cumulative, wt. percent on Tyler standard screens: | | | |
| On 8 mesh | 0.4 | 0.0 | 0.2 |
| On 10 mesh | 2.5 | 0.0 | 1.7 |
| On 14 mesh | 96.0 | 93.1 | 99.7 |
| On 20 mesh | 98.8 | 98.4 | 99.9+ |
| On 28 mesh | 99.9+ | 99.9+ | |

The nitrogen loss was 1-3% of the total nitrogen, increasing with increased slurry temperature. The products were a 25-25-0 grade with more than 95% of the $P_2O_5$ in a water soluble form and with excellent physical properties for handling and distribution. The storage properties were good and could be further enhanced by coating with an inert material such as kieselguhr.

*Example 3*

To demonstrate continuous operation, 985 pounds per hour of a 70% ammonium nitrate solution and 2590 pounds per hour of a wet-process phosphoric acid solution analyzing 24.5% $P_2O_5$ were continuously fed to a stirred tank. The pH of the mixture was maintained at about 5.9 by addition of ammonia beneath the liquid surface; a total of about 248 pounds per hour of ammonia were required. Under these conditions the phosphoric acid was largely converted to ammonium phosphates, the slurry containing a weight ratio of diammonium phosphate to monoammonium phosphate of about 1.75. The weight ratio of ammonium nitrate to total ammonium phosphates was approximately 0.6. Ammoniated slurry was continuously withdrawn from the tank to maintain a constant level. Approximately 3800 pounds per hour of slurry containing about 49% water was fed to a series of falling film evaporators each containing three 3¼" I.D. tubes 25' in length operated with cocurrent flow of air and a jacket temperature of 200° C. Slurry from the last evaporator at about 1.5% water and 175° C. was pumped continuously to the top of a pebbling tower where it was dispersed into drops by flinging it from rotating disks. The drops fell by gravity through a distance of about eighty feet during which time they hardened into spheres. The operation of evaporation and pebbling required about four minutes and less than 3% of the total N was lost. The collected pellets were passed through a rotary drum in which fifty-six pounds per hour of finely divided clay was added to coat the product; then the pellets were cooled and stored. One ton per hour of fertilizer analyzing 22.2% N, 31.7% available $P_2O_5$, and 0.9% water was obtained.

*Example 4*

Wet-process phosphoric acid analyzing 28.5% $P_2O_5$ was fed continuously into a stirred tank at a rate of 14,130 pounds per hour together with 9,364 pounds per hour of 80% ammonium nitrate solution. Anhydrous ammonia was added to the mixture at a rate of 1,300 pounds per hour. The overflow from this tank passed into a second stirred tank to which 4,030 pounds per hour of fertilizer grade potassium chloride analyzing 60% $K_2O$ was added. Ammonia was also added to the second tank at a rate of 400 pounds per hour. The slurry overflowing from this tank contained about one pound of ammonium nitrate for each pound of total ammonium phosphates and approximately 1.7 pounds of diammonium phosphate per pound of monoammonium phosphate. The slurry was pumped to three Turba-Film evaporators in which the water content was reduced from about 35 to 1% and the temperature raised to 175° C. The evaporators used in this example comprised externally heated vertical cylinders with an interior diameter of 26" and a heat transfer surface of 95 square feet each, equipped with rotor blades which were rotated at a speed of 300 r.p.m. with clearance between the blades and the heated wall of 0.1". The concentrated slurry was immediately pumped to a pebbling tower, dispersed into drops, and allowed to solidify by falling freely about 75 feet while being cooled by a flow of countercurrent air. The evaporation and pebbling equipment were designed for minimum hold-up. The slurry was maintained above 170° C. for only about four minutes so that less than 3% of the total nitrogen was lost. Solidified particles were continuously withdrawn from the bottom of the tower and mixed with 360 pounds per hour of a fine clay. About ten tons per hour of fertilizer analyzing 20.2–20.2–12.1 was thus produced. The finished product was in highly desirable form, being spherical particles with over 98% in the size range of 8 to 28 mesh. No recycle was needed. Over 95% of the total $P_2O_5$ was in a water soluble form.

Although certain preferred embodiments of the invention have been disclosed for purpose of illustration, it will be evident that various changes and modifications may be made therein without departing from the scope and spirit of the invention.

I claim:

1. The process of preparing a mixed fertilizer which comprises ammoniating aqueous phosphoric acid to obtain a product having a pH of 3.5–7, evaporating the resultant product in admixture with ammonium nitrate in a low retention time evaporator to a water content of 0.5–3%, dispersing drops of the concentrated slurry at an initial temperature of about 160–185° C. in a gaseous cooling medium and cooling the dispersed drops to a temperature at which they solidify, the weight ratio of ammonium nitrate to ammonium phosphates in the mixture subjected to evaporation being between 0.5 and 1.2, the weight ratio of diammonium phosphate to monoammonium phosphate not exceeding 2 to 1 and the total time at which the mixture is held at 160–185° C. is not over 10 minutes.

2. The process of claim 1 wherein before evaporation is completed, muriate of potash is added in a weight ratio to contained ammonium nitrate of not more than about 1:1.

3. The process of preparing a mixed fertilizer which comprises admixing nitric acid with phosphoric acid, treating the mixture with ammonia to obtain a slurry of ammonium nitrate and monoammonium phosphate, evaporating the resultant slurry in a low retention time evaporator to a water content of 0.5–3% and dispersing drops of the evaporated slurry at an initial temperature of about 160–185° C. in a gaseous cooling medium and cooling the dispersed drops to a temperature at which they solidify.

4. The process of preparing a mixed fertilizer which comprises admixing nitric acid with wet process phosphoric acid, in the presence of water, treating the mixture with ammonia to obtain a slurry in which the weight ratio of ammonium nitrate to total ammonium phosphate is about 0.5 to 1.2 and the weight ratio of diammonium phosphate to monoammonium phosphate does not exceed 2 to 1 and the water content is about 30–50%, evaporating the resultant slurry in a low retention time evaporator to a water content of 0.5–3% and pebbling the concentrated slurry fed at an initial temperature of about 160–185° C.

5. The process of preparing a mixed fertilizer which comprises admixing ammonium nitrate with wet process phosphoric acid, in the presence of water, treating the mixture with ammonia to obtain a slurry in which the weight ratio of ammonium nitrate to total ammonium phosphate is about 0.5 to 1.2 and the weight ratio of diammonium phosphate to monoammonium phosphate does not exceed 2 to 1 and the water content is about 30–50%, evaporating the resultant slurry in a low retention time evaporator to a water content of 0.5–3% and pebbling the concentrated slurry fed at an initial temperature of about 160–185° C.

6. The process of preparing a mixed fertilizer which comprises admixing nitric acid with wet process phosphoric acid in the presence of water, treating the mixture with ammonia to obtain a slurry in which the weight ratio of ammonium nitrate to monoammonium phosphate is about 0.7 to about 1 and the weight ratio of diammonium phosphate to monoammonium phosphate does not exceed 2 to 1 and the water content is about 40%, evaporating the resultant slurry in a film evaporator to a water content of 0.5–3% and pebbling the concentrated slurry by spraying it off the surface of a revolving drum heated to about 180° C. and permitting the drops to fall freely until they solidify.

7. The process of preparing a mixed fertilizer which comprises adding ammonium nitrate to wet process phosphoric acid, treating the mixture with ammonia to form a slurry containing diammonium phosphate, monoammonium phosphate and ammonium nitrate, said slurry containing up to twice as much diammonium phosphate as monoammonium phosphate by weight and a weight ratio of ammonium nitrate to total ammonium phosphates of about 0.5 to 1.2, evaporating the resultant slurry in a low retention time evaporator to reduce the water content to 0.5–3% and pebbling the concentrated slurry at a temperature of about 160–185° C.

8. The process of preparing a mixed fertilizer which comprises adding ammonium nitrate to wet process phosphoric acid, treating the mixture with ammonia to form a slurry containing up to twice as much diammonium phosphate as monoammonium phosphate by weight and a weight ratio of ammonium nitrate to total ammonium phosphates of about 0.5 to 1.2 having a pH of about 5.8 containing diammonium phosphate, monoammonium phosphate, ammonium nitrate and about 40% water, evaporating the resultant slurry in a low retention time evaporator to reduce the water content to 0.5–3% and pebbling the concentrated slurry fed to a dispersion means at a temperature of about 160–185° C.

9. The process of preparing a mixed fertilizer which comprises continuously adding ammonium nitrate solution and wet process phosphoric acid to an agitated vessel while maintaining the mixture at a pH of about 5.9 by the addition of ammonia thereto thereby forming a slurry containing up to twice as much diammonium phosphate as monoammonium phosphate by weight and a weight ratio of ammonium nitrate to total ammonium phosphates of about 0.5 to 1.2, continuously withdrawing the ammoniated slurry from the tank to maintain a constant level, feeding said ammoniated slurry to a low retention time evaporator to reduce its water content to 0.5–3% and continuously feeding the dewatered slurry to a pebbling tower at a temperature of about 160–185° C. where it is dispersed into drops and solidified as it falls.

10. The process of preparing a mixed fertilizer which comprises continuously adding ammonium nitrate solution and wet process phosphoric acid to an agitated vessel while maintaining the mixture at a pH between 3.5 and 7 by the addition of ammonia thereto thereby forming a slurry containing about 49% water, said slurry containing up to twice as much diammonium phosphate as monoammonium phosphate by weight and a weight ratio of ammonium nitrate to total ammonium phosphates of about 0.5 to 1.2, continuously withdrawing the ammoniated slurry from the tank to maintain a constant level, feeding said ammoniated slurry to a low retention time evaporator to reduce its water content to 0.5–3% and continuously feeding the dewatered slurry to a pebbling tower at a temperature of about 160–185° C. where it is dispersed into drops and solidified as it falls.

11. The process of preparing a mixed fertilizer which comprises continuously feeding wet process phosphoric acid and ammonium nitrate solution into an agitated reaction vessel, introducing anhydrous ammonia thereto, collecting the overflow from said vessel in a second agitated vessel to which potassium chloride is added along with ammonia, collecting the slurry overflowing from said second vessel and passing it through a low retention time evaporator to reduce the water content to 0.5–3%, feeding the dewatered slurry containing up to twice as much diammonium phosphate as monoammonium phosphate by weight and a weight ratio of ammonium nitrate to total ammonium phosphates of about 0.5 to 1.2 to a pebbling tower wherein it is dispersed into drops and allowed to solidify by falling through the air.

12. The process of preparing a mixed fertilizer which comprises continuously feeding wet process phosphoric acid and ammonium nitrate solution into an agitated reaction vessel, introducing anhydrous ammonia thereto, collecting the overflow from said vessel in a second agitated vessel to which potassium chloride is added along with ammonia, collecting the slurry having a pH of 3.5–7 overflowing from said second vessel and passing it through a low retention time evaporator to reduce the water content to 0.5–3%, feeding the dewatered slurry containing up to twice as much diammonium phosphate as monoammonium phosphate by weight and a weight ratio of ammonium nitrate to total ammonium phosphates of about 0.5 to 1.2 to a pebbling tower wherein it is dispersed into drops and allowed to solidify by falling through the air.

References Cited in the file of this patent
UNITED STATES PATENTS

| | | |
|---|---|---|
| 1,999,026 | Tramm et al. | Apr. 23, 1935 |
| 2,025,916 | Tramm | Dec. 31, 1935 |
| 2,614,040 | Kailinger | Oct. 14, 1952 |
| 2,680,680 | Coleman | June 8, 1954 |
| 2,774,660 | Cook et al. | Dec. 18, 1956 |
| 2,939,781 | Gilliam | June 7, 1960 |
| 2,957,763 | Barnes et al. | Oct. 25, 1960 |